US007266573B2

(12) United States Patent
Pecht-Seibert (10) Patent No.: US 7,266,573 B2
(45) Date of Patent: Sep. 4, 2007

(54) CROSS-SYSTEM UPDATE METHOD AND SYSTEM (75) Inventor: Guenter Josef Pecht-Seibert, Muehlhausen (DE)

(73) Assignee: SAP AG, Walldorf (DE)

( * ) Notice: Subject to any disclaimer, the term of this patent is extended or adjusted under 35 U.S.C. 154(b) by 479 days.

(21) Appl. No.: 10/743,132

(22) Filed: Dec. 23, 2003

(65) Prior Publication Data

US 2005/0138086 A1 Jun. 23, 2005

(51) Int. Cl.
G06F 12/00 (2006.01)
G06F 17/30 (2006.01)
G06F 17/60 (2006.01)

(52) U.S. Cl. ............... 707/203; 707/200; 707/201; 707/202; 707/204; 705/36; 705/37; 705/27

(58) Field of Classification Search ........ 707/200–204; 705/36–37, 27
See application file for complete search history.

(56) References Cited

U.S. PATENT DOCUMENTS

| 5,101,353 | A | * | 3/1992 | Lupien et al. ............. 705/37 |
| 5,666,493 | A | * | 9/1997 | Wojcik et al. ............. 705/26 |
| 6,208,976 | B1 | * | 3/2001 | Kinebuchi et al. ......... 705/15 |
| 6,539,386 | B1 | * | 3/2003 | Athavale et al. .......... 707/10 |
| 6,981,061 | B1 | * | 12/2005 | Sakakura ................. 709/248 |
| 2002/0013753 | A1 | * | 1/2002 | de Chabris et al. ....... 705/36 |
| 2002/0178104 | A1 | * | 11/2002 | Hausman ................. 705/37 |
| 2003/0050886 | A1 | * | 3/2003 | Cohen et al. ............. 705/37 |
| 2003/0220850 | A1 | * | 11/2003 | Chu et al. ............... 705/28 |

* cited by examiner

Primary Examiner—Apu Mofiz
Assistant Examiner—Cindy Nguyen
(74) Attorney, Agent, or Firm—Kenyon & Kenyon LLP (57) ABSTRACT A system and method for updating a business object, where the business object is distributed across multiple computing systems. One of the computing systems is designated as a master or principal computing system. Each copy of the business object includes an update counter, which may be updated only by the master. Changes to the business object may be received from a subordinate computing system only when the value of the update counter at the subordinate is equal to the value of the update counter at the master. Embodiments of the invention permit the controlled manipulation of objects that are distributed across multiple computing systems. Furthermore, embodiments of the invention may be implemented with little or no modification to existing applications, each of which may employ very different data record locking mechanisms.

30 Claims, 6 Drawing Sheets

CROSS-SYSTEM UPDATE METHOD AND SYSTEM

TECHNICAL FIELD

This invention relates generally to digital data processing. More particularly, the invention relates to methods and systems for managing independent updates to a distributed object maintained by multiple business management systems.

BACKGROUND OF THE INVENTION

In a business computing environment, database management systems are frequently used to administer and control information relating to complex business functions, such as inventory management, purchasing and receiving. Additionally, while certain components of a business computing environment may control "live" operations, other components may be used for planning and forecasting purposes. From time to time, business planning systems may interact with "live" systems. For example, when a product order is received in a live system, the live system may update the planning system, so that future plans and forecasts are based on the most up to date information. Similarly, business activities that are planned to occur, such as a recurring order from a long-term customer, may be transmitted from the planning system to the live system.

When a live system and a planning system both attempt to issue an update to the same business object, inconsistencies in the underlying information describing the business object may be inadvertently created. This may happen, for example, when conflicting orders for a specific product are generated by the live system and the planning system simultaneously.

Figure 2:
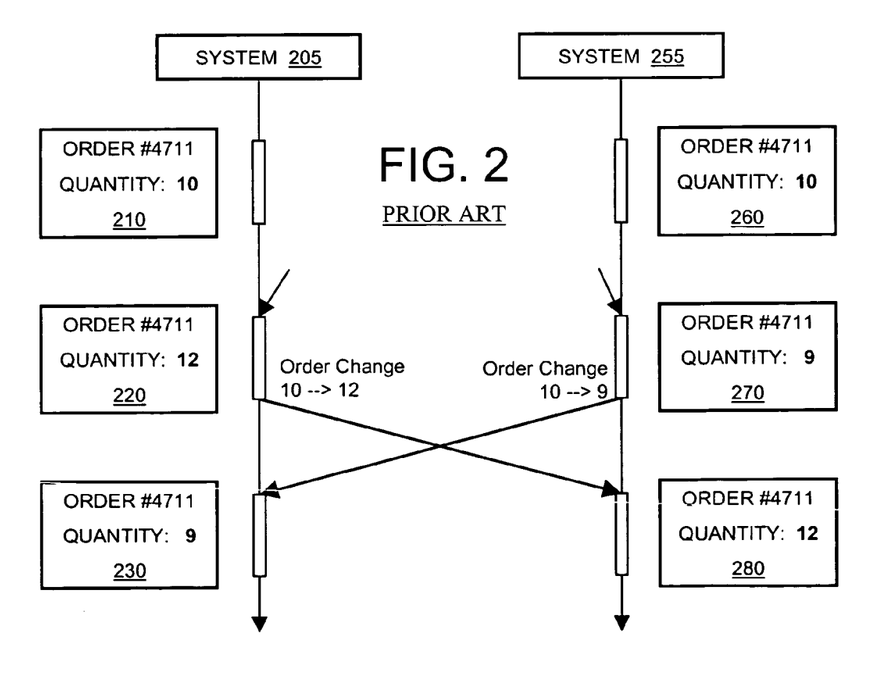
FIG. 2 illustrates the problem of conflicting orders generated by parallel business management systems.

FIG. 2 illustrates the problem of conflicting orders generated by parallel business management systems. System 205 may correspond to a live system; and system 255 may correspond to a planning system, for example. Initially, both systems include identical versions of purchase order #4711. In system 205, purchase order #4711 indicates that 10 units have been ordered (210). Similarly, in system 255, purchase order #4711 also indicates that 10 units have been ordered (260).

Then, virtually simultaneously (but possibly for different reasons), order changes are received within each system. In system 205, the number of units has been changed from 10 to 12 (220). However, in system 255, the number of units has been changed from 10 to 9 (270). Each system then attempts to transmit the order change to the other system, i.e., to synchronize. The result is confusion. Both systems receive updates simultaneously, and accordingly both systems respond by updating their internal information. System 205 ends up showing that 9 units have been ordered (230), while system 255 indicates that 12 units have been ordered (280). It is possible that both system 205 and system 255 will then simultaneously inform each other that an order has changed yet again, and an endless update loop may be created. Similar inconsistencies may arise between system 205 and system 255 when other kinds of changes to a business object are made in parallel.

Business computing environments are not the only situations where conflicting parallel operations may create inconsistencies between cooperating systems. Data synchronization difficulties may exist whenever updates to an object may be distributed across different computing systems, particularly when one system uses one record or data locking technique and another system uses another record locking technique.

Accordingly, there is a need in the art for a system and method to manage independent simultaneous updates to an object that is distributed across multiple computing systems.

SUMMARY OF THE INVENTION

Embodiments of the present invention are directed to a system and method for updating a business object, where the business object is distributed across multiple computing systems. One of the computing systems is designated as a master or principal computing system. Each copy of the business object includes an update counter, which may be updated only by the master. Changes to the business object may be received from a subordinate computing system only when the value of the update counter at the subordinate is equal to the value of the update counter at the master. Embodiments of the invention permit the controlled manipulation of objects that are distributed across multiple computing systems. Furthermore, embodiments of the invention may be implemented with little or no modification to existing applications, each of which may employ very different data record locking mechanisms.

DETAILED DESCRIPTION

Embodiments of the present invention will be described with reference to the accompanying drawings, wherein like parts are designated by like reference numerals throughout, and wherein the leftmost digit of each reference number refers to the drawing number of the figure in which the referenced part first appears.

Figure 1:
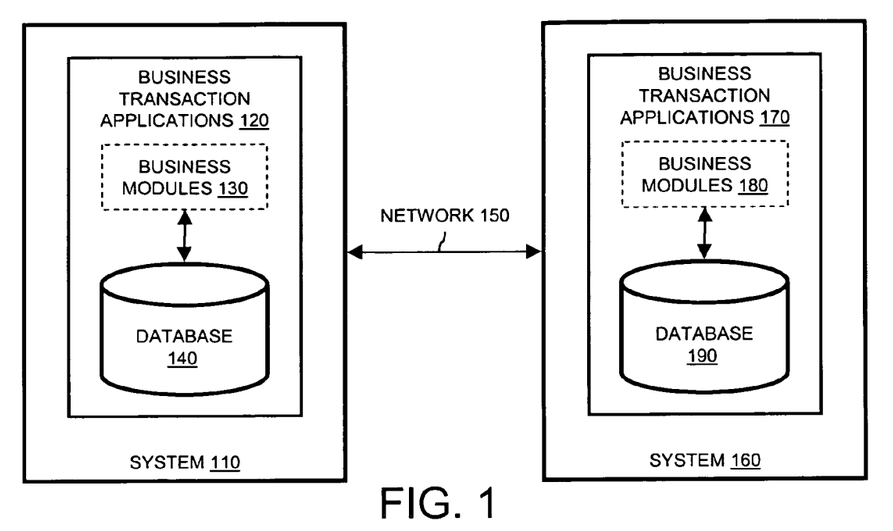
FIG. 1 is a high-level block diagram of a computer system incorporating a method for updating a distributed business object in accordance with an embodiment of the present invention.

FIG. 1 is a high-level block diagram of a computer system incorporating a method for updating a distributed business object in accordance with an embodiment of the present invention. System 110 and system 160 are independent computing systems incorporating business transaction applications that are connected to each other via network 150. Within system 110, business transaction applications 120 may perform database transactions triggered by an external event (not shown) or initiated by a message received from another computer system (e.g., system 160) via network 150. Business transaction applications 120 may interact with business modules 130, which may then invoke database 140 to manipulate a variety of information, including the current states of business objects. According to an embodiment of the present invention, one of the business modules 130 may correspond to a method for updating distributed business objects.

Still referring to FIG. 1, system 160 may be configured similarly to system 110. Business transaction applications 170 may perform database transactions triggered by an external event (not shown) or initiated by a message received from another computer system (e.g., system 110) via network 150. Business transaction applications 170 may interact with business modules 180, which may then invoke database 190 to manipulate information, including the current states of business objects. One of business modules 180 may correspond to a method for updating distributed business objects in accordance with an embodiment of the present invention.

Figure 3A:
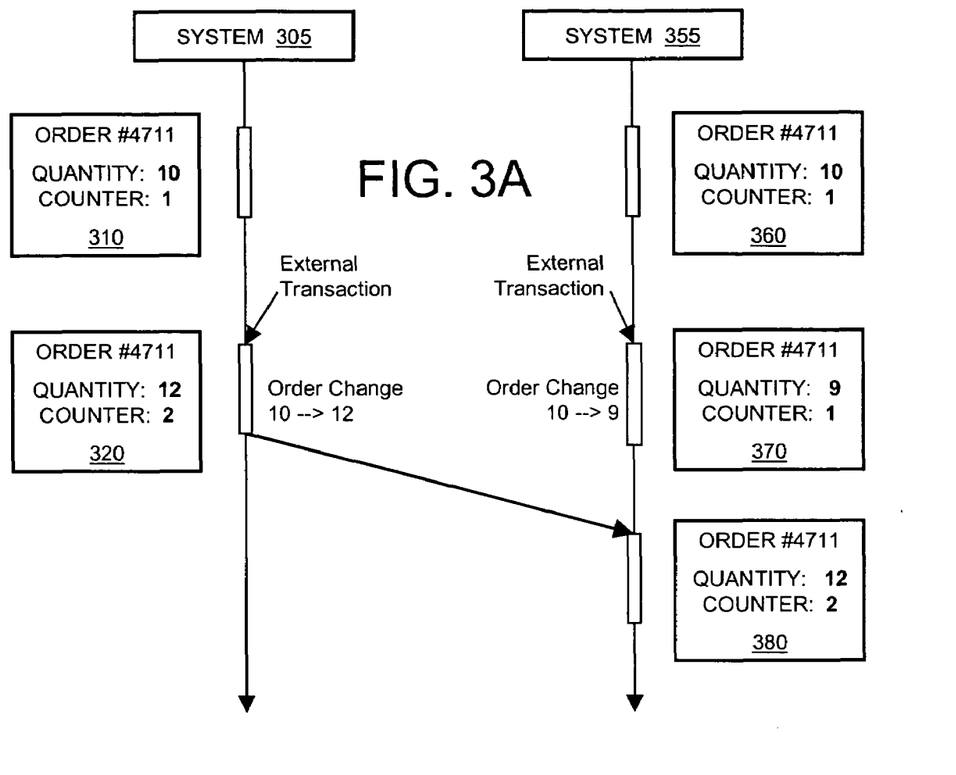
FIG. 3A is a process diagram illustrating the coordinated update of a business object where a modification of the object at a master computing system preempts a pending modification of the object at a subordinate, in accordance with an embodiment of the present invention.

FIG. 3A is a process diagram illustrating the coordinated update of a business object where a modification of the object at a master computing system preempts a pending modification of the object at a subordinate, in accordance with an embodiment of the present invention. System 305 may correspond to a master computing system; and system 355 may correspond to a subordinate system. In each case, purchase order #4711 is a distributed business object managed by both systems. In system 305, purchase order #4711 initially indicates that 10 units have been ordered (310). Similarly in system 355, purchase order #4711 also indicates that 10 units have been ordered (360). Furthermore, the update counter in system 305 indicates a value of one (310). Because the update counter in system 355 also indicates a value of one (360), purchase order #4711 has been synchronized across both systems.

At (320) and (370), external transaction events trigger separate updates to order #4711. In system 305, the quantity is changed from 10 to 12. Because system 305 is a master computing system, the update counter associated with purchase order #4711 is incremented. Thus, at (320), update counter indicates a value of two. In system 355, however, the quantity is changed from 10 to 9. Because system 355 is a subordinate system, the update counter associated with system 355's purchase order #4711 remains unmodified at a value of one. At this point, purchase order #4711 is not synchronized across system 305 and system 355. To inform subordinate system 355 of the change that occurred in system 305, system 305 then transmits an order change message to subordinate system 355. System 355 receives the order change message and copies the order change information into the business object associated with purchaser order #4711 (380). Purchase order #4711 is synchronized again.

Figure 3B:
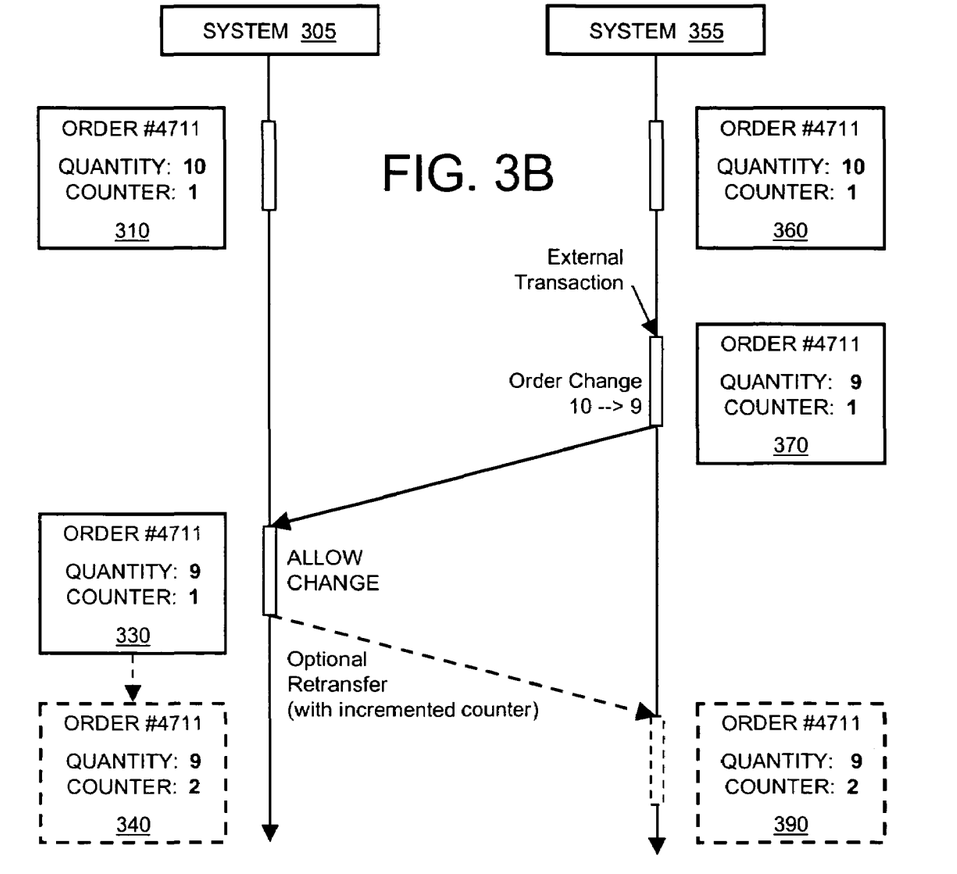
FIG. 3B is a process diagram illustrating the coordinated update of a business object where a modification of the object at a subordinate computing system is permitted to predominate, in accordance with an embodiment of the present invention.

FIG. 3B is a process diagram illustrating the coordinated update of a business object where a modification of the object at a subordinate computing system is permitted to predominate, in accordance with an embodiment of the present invention. In this example, subordinate system 355 is the only computing system that receives an external transaction event to trigger an update to purchase order #4711 (370). In accordance with an embodiment of the present invention, system 355 completes the transaction by changing the purchase order quantity from 10 to 9, and then notifies master system 305 of the update (370) by issuing an order change message. When system 305 receives the order change message, it first compares the value of the respective systems' update counters. Because system 305's update counter for its purchase order #4711 has a value of 1 (from 310), and system 355's update counter for its purchase order #4711 also has a value of 1 (from 370), system 305 may permit the order change message to be processed, thereby changing the quantity for purchase order #4711 from 10 to 9. Because purchase order #4711 is now synchronized, system 305 need not increment the update counter. Hence, the update counter may remain at a value of 1 (330). However, if system 305 determines that system 355 should be (re)informed of the change, it may then optionally increment the update counter from 1 to 2 (340) and may then transmit the updated change order back to system 355 (390).

Figure 3C:
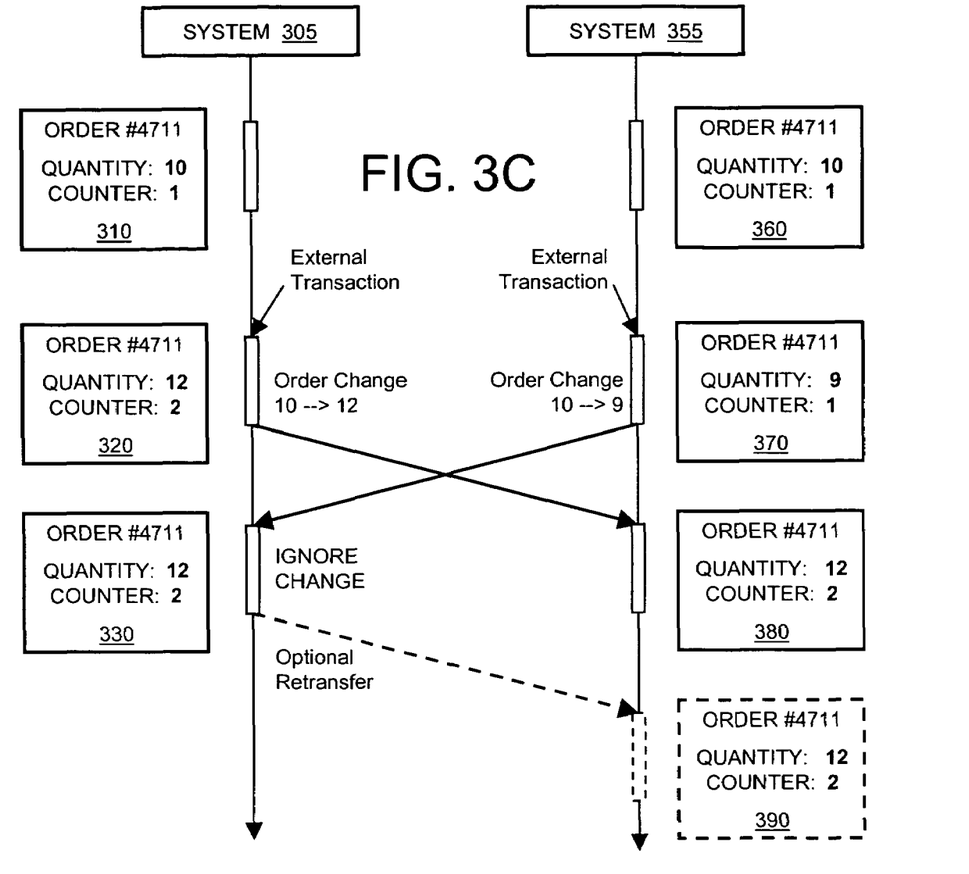
FIG. 3C is a process diagram illustrating the coordinated update of a business object where a modification of the object at a master computing system predominates over a conflicting modification of the object at a subordinate, in accordance with an embodiment of the present invention.

FIG. 3C is a process diagram illustrating the coordinated update of a business object where a modification of the object at a master computing system predominates over a conflicting modification of the object at a subordinate computing system, in accordance with an embodiment of the present invention. As in FIG. 3A, external transaction events trigger separate updates to order #4711 at (320) and (370). In system 305, the quantity is changed from 10 to 12 (320). Because system 305 is a master computing system, the update counter associated with purchase order #4711 is incremented. Thus, at (320), update counter indicates a value of two. In system 355, however, the quantity for purchase order #4711 is changed from 10 to 9 (370). Because system 355 is a subordinate system, the update counter associated with system 355's purchase order #4711 remains unmodified at a value of one. Then, both system 305 and system 355 transmit an order change message to the other system. System 355 receives the order change message and copies the order change information into the business object associated with purchaser order #4711 (380). However, when system 305 receives the order message sent by system 355, it does not update its purchase order #4711 business object. The reason is the respective update counters contain different values. System 305's update counter for purchase order #4711 has a value of 2. However, system 355's update counter for purchase order #4711 has a value of 1. Thus, system 305 is able to determine that an intervening update occurred to purchase order #4711 before system 355 transmitted its order change. System 305 therefore ignores system 355's order change. Because the respective update counters are equal, purchase order #4711 is synchronized again (330). System 305 may choose to retransmit its previous order change, or it can assume that system 355 correctly handled the previous message, and elect not to retransmit.

According to an embodiment, whenever a change is made to a business object within the master system 305, and the change is relevant for a subordinate system 355, the update counter is incremented by the master system 305 and the business object is transmitted, along with the new value of the update counter, to the subordinate system 355.

Figure 4:
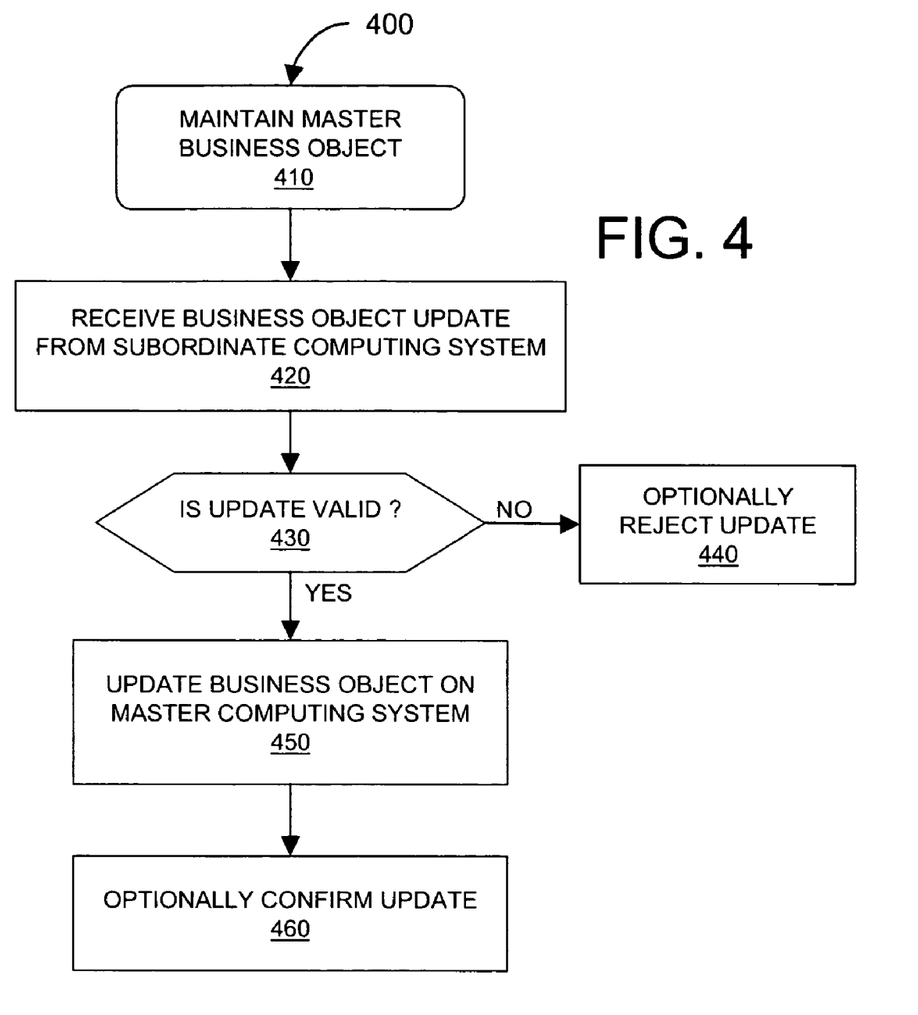
FIG. 4 is a flow chart illustrating a method for updating a distributed business object at a master computing system, in accordance with an embodiment of the present invention.

FIG. 4 is a flow chart illustrating a method 400 for updating a distributed business object at a master computing system, in accordance with an embodiment of the present invention. Method 400 may begin with a primary business object in a synchronized state (410). Method 400 may then receive an update to the business object from a subordinate computing system (420). To determine whether the update is valid, method 400 compares the update counter for the master version of the business object with the update counter for the subordinate version of the business object (430). If the two update counters are the same, method 400 may permit the update to proceed (440). However, if the update counters are different, method 400 may ignore the update message, or may optionally choose to reject the update message (440). If the update message is accepted and performed, including incrementing the update counter for the master version of the business object, method 400 may optionally send an update confirmation message to the subordinate computing system (460).

Figure 5:
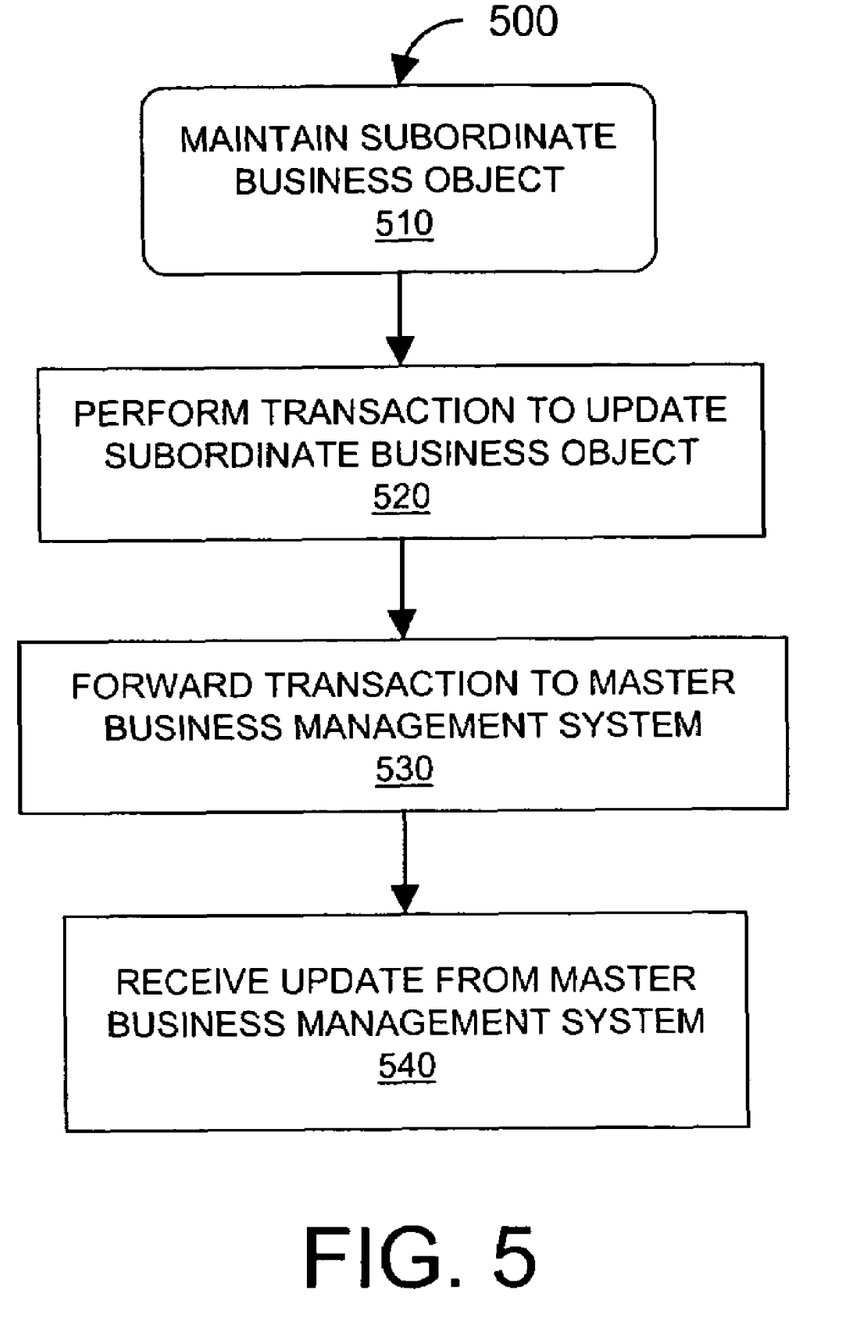
FIG. 5 is a flow chart illustrating a method for updating a distributed business object at a subordinate computing system, in accordance with an embodiment of the present invention.

FIG. 5 is a flow chart illustrating a method 500 for updating a distributed business object at a subordinate computing system, in accordance with an embodiment of the present invention. Method 500 may begin with a subordinate business object in a synchronized state (510). Method 500 may then receive an external triggering event, which may cause method 500 to perform a transaction to update the subordinate business object (520). After the subordinate business object has been updated, method 500 may then transmit an order change message to a master computing system (530). Depending on the state of update counters, master computing system may transmit a confirmation message or a rejection message to the subordinate computing system. Method 500 may receive this message and update the subordinate business object accordingly (540).

Several embodiments of the present invention are specifically illustrated and described herein. However, it will be appreciated that modifications and variations of the present invention are covered by the above teachings and within the purview of the appended claims without departing from the spirit and intended scope of the invention.

What is claimed is:

1. A method for updating a distributed business object, comprising:
   maintaining a primary version of the distributed business object in a primary business management system, said primary version including a primary update counter;
   receiving from a secondary business management system a notification of an update to a secondary version of the distributed business object, said secondary version including a secondary update counter, said notification including the secondary update counter;
   comparing the primary update counter to the secondary update counter; and
   updating the primary version of the distributed business object based on the notification if the comparison indicates that the primary update counter and the secondary update counter are identical.

2. The method of claim 1, further comprising:
   rejecting the update if the comparison indicates that the primary update counter and the secondary update counter are different.

3. The method of claim 2, further comprising:
   transmitting a rejection to the secondary business management system, said rejection including the primary update counter.

4. The method of claim 3, wherein said rejection includes the primary version of the distributed business object.

5. The method of claim 1, wherein the updating further comprises
   incrementing the primary update counter; and
   returning a confirmation of the update to the secondary business management system, said confirmation including the incremented primary update counter.

6. The method of claim 1, further comprising:
   incrementing the primary update counter only when the secondary business management system must be informed of the update to the business object.

7. A method for updating a distributed business object, comprising:
   maintaining a secondary version of the distributed business object in a secondary business management system, said secondary version including a secondary update counter;
   performing a transaction on the secondary version in the secondary business management system;
   leaving the secondary update counter unmodified;
   forwarding a representation of the transaction to a primary business management system, the representation including the unmodified secondary update counter;
   comparing a primary update counter to the secondary update counter; and
   updating a primary version of the distributed business object based on the notification if the comparison indicates that the primary update counter and the secondary update counter are identical.

8. The method of claim 7, further comprising:
   receiving from the primary business management system a confirmation of the transaction, said confirmation including a replacement value for the secondary update counter.

9. The method of claim 7, further comprising:
   receiving from the primary business management system a rejection of the transaction, said rejection including a replacement value for the secondary update counter, said rejection including replacement information for the secondary version of the distributed business object.

10. A system for updating a distributed business object, comprising:
    a first computer coupled to a network, said first computer having a primary business management system, said primary business management system maintaining a primary version of the distributed business object, said primary version including a primary update counter;
    a second computer coupled to a network, said second computer having a secondary business management system, said secondary business management system maintaining a secondary version of the distributed business object, said secondary version including a secondary update counter;
    the second computer to perform a first transaction on the secondary version; said transaction leaving the secondary update counter unmodified;
    the second computer to forward a notification of the first transaction to the primary business management system, the notification including the unmodified secondary update counter;
    the first computer to receive the notification from the second computer;
    the first computer to compare the primary update counter to the secondary update counter;
    the first computer to update the primary version based on the notification if the comparison indicates that the primary update counter and the secondary update counter are identical.

11. The system of claim 10, the first computer to reject the update if the comparison indicates that the primary update counter and the secondary update counter are different.

12. The system of claim 11, the first computer to transmit said rejection to the secondary business management system, said rejection including the primary update counter.

13. The system of claim 12, wherein said rejection includes the primary version of the distributed business object.

14. The system of claim 10, the first computer to increment the primary update counter upon updating the primary version, the first computer to return a confirmation of the update to the secondary business management system, said confirmation including the incremented primary update counter.

15. The system of claim 10, further comprising:
the first computer to perform a second transaction on the primary version of the distributed business object;
the first computer to update the primary version based on the second transaction;
the first computer to increment the primary update counter upon updating the primary version; and
the first computer to forward a confirmation of the update to the secondary business management system, said confirmation including the incremented primary update counter.

16. A computer programmed to update a distributed business object, comprising:
means to maintain a primary version of the distributed business object in a primary business management system, said primary version including a primary update counter;
means to receive from a secondary business management system a notification of an update to a secondary version of the distributed business object, said secondary version including a secondary update counter, said notification including the secondary update counter;
means to compare the primary update counter to the secondary update counter; and
means to update the primary version of the distributed business object based on the notification if the comparison indicates that the primary update counter and the secondary update counter are identical.

17. The computer of claim 16, further comprising:
means to reject the update if the comparison indicates that the primary update counter and the secondary update counter are different.

18. The computer of claim 17, further comprising:
means to transmit the rejection to the secondary business management system, said rejection including the primary update counter.

19. The computer of claim 18, wherein said rejection includes the primary version of the distributed business object.

20. The computer of claim 18, wherein the means to update further comprises incrementing the primary update counter.

21. The computer of claim 20, further comprising:
means to return a confirmation of the update to the secondary business management system, said confirmation including the incremented primary update counter.

22. A computer programmed to update a distributed business object, comprising:
means to maintain a secondary version of the distributed business object in a secondary business management system, said secondary version including a secondary update counter;
means to perform a transaction on the secondary version in the secondary business management system;
means to leave the secondary update counter unmodified;
means to forward a representation of the transaction to a primary business management system, the representation including the unmodified secondary update counter;
means to compare a primary update counter to the secondary update counter; and
means to update a primary version of the distributed business object based on the notification if the comparison indicates that the primary update counter and the secondary update counter are identical.

23. The computer of claim 22, further comprising:
means to receive from the primary business management system a confirmation of the transaction, said confirmation including a replacement value for the secondary update counter.

24. The computer of claim 22, further comprising:
means to receive from the primary business management system a rejection of the transaction, said rejection including a replacement value for the secondary update counter, said rejection including replacement information for the secondary version of the distributed business object.

25. A machine-readable medium having stored thereon a plurality of instructions for paralleling a database query, the plurality of instructions comprising instructions to:
maintain a primary version of the distributed business object in a primary business management system, said primary version including a primary update counter;
receive from a secondary business management system a notification of an update to a secondary version of the distributed business object, said secondary version including a secondary update counter, said notification including the secondary update counter;
compare the primary update counter to the secondary update counter; and
update the primary version of the distributed business object based on the notification if the comparison indicates that the primary update counter and the secondary update counter are identical.

26. The machine-readable medium of claim 25, further comprising instructions to:
reject the update if the comparison indicates that the primary update counter and the secondary update counter are different.

27. The machine-readable medium of claim 26, further comprising instructions to:
transmit a rejection to the secondary business management system, said rejection including the primary update counter.

28. The machine-readable medium of claim 27, wherein said rejection includes the primary version of the distributed business object.

29. The machine-readable medium of claim 27, wherein the updating further comprises incrementing the primary update counter.

30. The machine-readable medium of claim 29, further comprising instructions to:
return a confirmation of the update to the secondary business management system, said confirmation including the incremented primary update counter.

* * * * *